Figure 1:
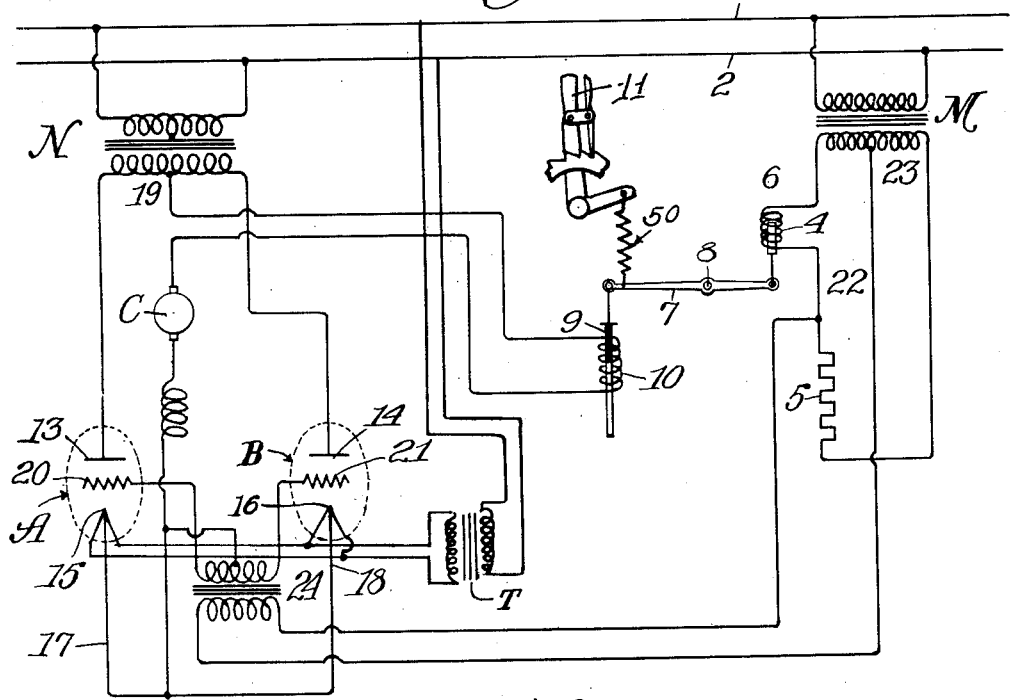

Nov. 14, 1939.  H. E. YOUNG  2,179,569

MOTOR CONTROL

Original Filed March 15, 1933   2 Sheets-Sheet 1

Inventor:
Hugh E. Young,
By Dyrenforth, Lee, Chritton & Wiles,
Attys.

Nov. 14, 1939.     H. E. YOUNG     2,179,569
MOTOR CONTROL
Original Filed March 15, 1933    2 Sheets-Sheet 2
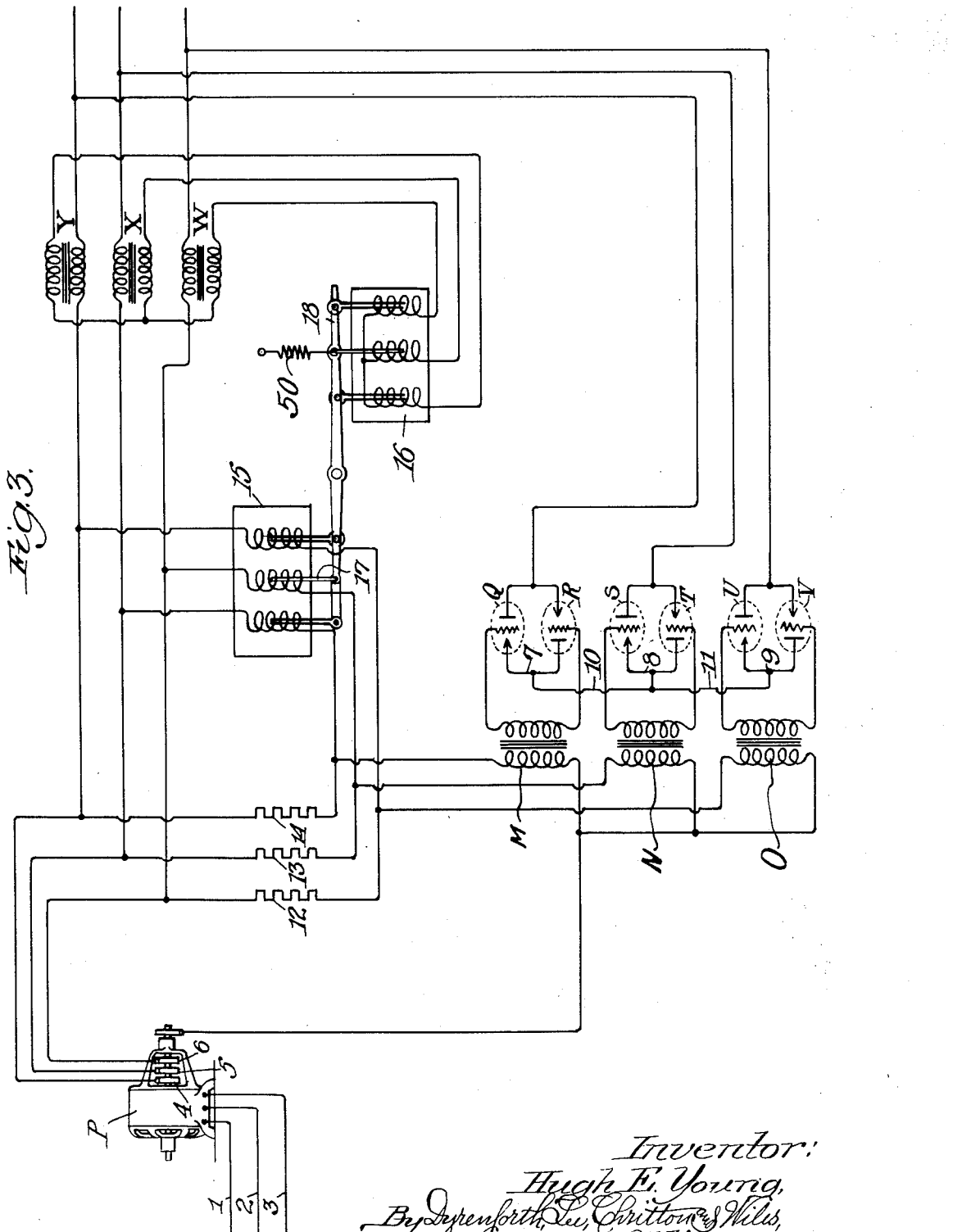
Inventor:
Hugh E. Young,
By Dyrenforth, Lee, Chritton & Wiles,
Attys.

Patented Nov. 14, 1939

2,179,569

UNITED STATES PATENT OFFICE 2,179,569

MOTOR CONTROL

Hugh E. Young, Chicago, Ill.

Application March 15, 1933, Serial No. 660,955
Renewed March 23, 1939

3 Claims. (Cl. 172—274)

The present invention relates to the control of current flow to motors and the acceleration thereof.

The starting and acceleration of electric motors, particularly such as are operated from an alternating current supply line, has heretofore generally been accomplished by the employment of resistance in the rotor circuit or reactance in the line to hold back the current flow when the counter-electromotive force is lacking or lower than desired.

It is an object of the present invention to employ an electron tube operating within and upon the individual cyclical impulses of impressed potential and resultant current flow instead of employing resistance, for regulating starting, acceleration speed control and reversing of a motor.

According to my invention, an automatic current sensitive regulator controls the time of firing of the control tube for each cycle in order to limit the effective current flow. Thus, instead of wasting energy in the resistance as frequently employed, the tube permits the selection of such parts of the current wave as are required to make up the predetermined current flow, even though the resistance of the motor circuit to current flow be merely the ohmic resistance of the motor as at standstill or the ohmic resistance plus the counter-electromotive force when the motor is operating at some selected speed, or the ohmic resistance minus the counter-electromotive force when the motor is plugged, i. e., connected in reverse while mechanically running forward.

The regulator controls the phase shift of grid excitation of the tube, either by a movable core of an inductance as shown in one embodiment, or by magnetically varying the inductive effect of a grid phase control circuit, as shown in another modification, with the result that no matter what the variations of line potential or resistance to current flow due to conductivity, or counter-electromotive force, the current will be the same, and will not exceed the predetermined value. Thus it is possible to throw the motor directly across the line without taking any more current than the predetermined value. Similarly, it is possible to plug the motor, i. e., throw the control switch to reverse while the motor is running full speed forward without allowing any more than the predetermined current to flow therethrough.

The invention applies not only to direct current motors which are operated by rectified current, but may also be applied to alternating current motors, as hereafter described and illustrated in detail.

Now in order to acquaint those skilled in the art with the manner of constructing and operating my invention, I shall describe, in connection with the accompanying drawings, a specific embodiment of the same.

Figure 2:
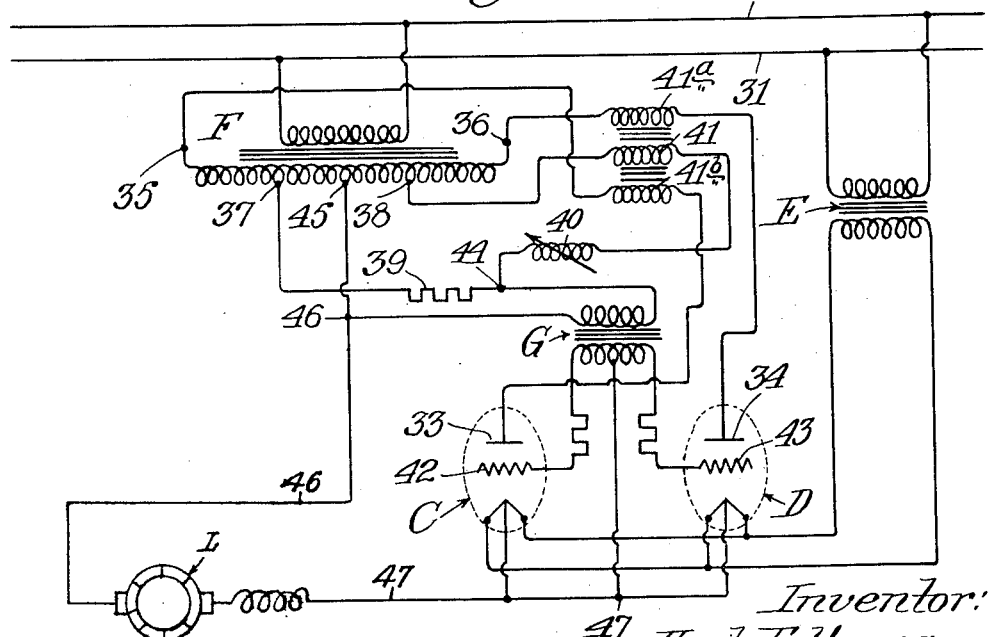

Figure 1 is a general schematic diagram of the invention applied to a D. C. series motor; Fig. 2 is a diagram of a modified embodiment of my invention; and Fig. 3 shows the application of the invention to a slip ring induction motor.

Referring to Fig. 1, I and 2 indicate the A. C. power lines. A transformer M supplies current to a phase splitting device consisting of a coil 4 connected in series with a resistance 5. The inductance of coil 4 is changed by any movement of the plunger 6 which is connected to a lever 7 pivoted at the point 8 and actuated at the other end by an iron plunger 9 operating in a solenoid 10. The plunger 9 is controlled manually by an adjustable handle 11 through a spring 50. Current necessary for the operation of the motor is taken from the power supply line by means of a transformer N. One side of the secondary winding is connected to the plate 13 of the tube A. The other terminal of the secondary connects to the plate 14 of the tube B. The filaments 15 and 16 of tubes A and B, respectively, are operated by a transformer T and are connected together by the wires 17 and 18. The D. C. series motor C is connected at one end to the filaments of tubes A and B and through solenoid 10 to the center tap 19 of transformer 12. The control voltage for the grids 20 and 21 of tubes A and B is obtained from the phase splitting device between points 22 and 23, this voltage being applied to the grids 20 and 21 through transformer 24.

The operation of the circuit is as follows: The tubes A and B operate as half wave rectifiers and supply a current for the motor C in the usual manner. The mean position of the plunger 10 is adjusted by setting of the adjustable handle 11 operating through spring 50. If, for any reason, the current through the motor changes, the plunger 9 will be operated upon by the current through solenoid 10 and will result in moving the plunger 6 from its normal position, which normal position depends upon the tension of the spring 50. The change in inductance resulting from any change in position of plungers 6 will, in turn, change the phase of the voltage between points 22 and 23 and this, in turn, will operate upon the grids 20 and 21 of tubes A and B so as to keep the current through the motor substantially constant. The relative movement of the plungers 9 and 6 are such as to cause the inductance 4 to increase when the motor current increases and thus causes the grid voltage to become more out of phase with the anode voltage which, of course, reduces the average motor current to substantially its former value. The opposite action takes place when the motor current decreases. Since this effect takes place at any given set position of the plunger 9, it is evident that the motor can be reversed without drawing an excessive current.

From the above it may be seen that the motor may be connected at standstill to the source of pulsating direct potential and the current will be limted to the selected predetermined value by operation of the regulator 10—4. The impulses of current are selected portions of the rectified waves, and are peculiarly effective to start a load because of their momentary high value, although the mean effective value may be much lower. As the motor accelerates the counter-electromotive force builds up with increasing speed, but the regulator 10—4 shifts the phase of grid excitation to increase the potential applied until the predetermined value of current flow is again restored. This adjustment is substantially instantaneous in that it occurs within the cycle of commercial frequency. Likewise, the motor may be reversed at full speed. This is generally termed "plugging the motor". When so re-reversed at full speed, the counter-electromotive force of the armature acts like a negative resistance, but through the action of the regulator 10—4, the effective current does not rise above the predetermined value.

The frequency of the impulses of direct current is fixed by the frequency of the alternating current supply 1—2. The regulator 10—4 is capable of shifting the grid potential through substantially 180 electrical degrees, and hence is capable of maintaining the current flow within a predetermined limit or constant as desired throughout all speed and load conditions within the torque of the particular predetermined current value. By shifting the grid potential from zero angle towards 180° angle not only is the duration of applied potential for each impulse varied, but also the effective potential throughout said period is varied.

In order to change the speed of the motor it is only necessary to change the inductance of coil 4 by moving handle 11.

Referring to Fig. 2, 30 and 31 indicate the A. C. power supply. The filaments of the tubes C and D are supplied with curent by the filament transformer E. Another transformer F supplies A. C. voltage to the plates 33 and 34 of tubes C and D from the secondary terminals 35 and 36. Two other terminals 37 and 38 of the secondary furnish the voltage for the phase splitting device made up of resistor 39, variable inductance 40 and the counter-electromotive force coil 41. The voltage for the grids 42 and 43 of tubes C and D is supplied through the grid transformer G. One end of the primary windings of this transformer is connected to the point 44 forming the common connection between resistor 39 and variable inductance 40. The other end of the primary winding is connected to the center tap 45 of transformer F. A direct current series motor L is operated by the impulses of direct curent potential supplied by the tubes C, D. The D. C. voltage required to operate the motor is obtained between points 46 and 47 which constitute the output terminals of the tubes C and D.

Operation of the apparatus shown in Fig. 2 is practically the same as that of Fig. 1. The curent to the motor is controlled by shifting the phase of the voltage applied to the grids of the tubes C and D, and the phase of the control voltage can be adjusted by means of variable inductance 40. Since the inductance 40 can be changed by very small steps, it is evident that a very fine control of the speed of the motor can be obtained.

Anodes 33 and 34 are connected to transformer F through primary coils 41ª and 41ᵇ, which induce a counter-electromotive force into secondary coil 41. This C. E. M. F. produces the same effect in the phase split circuit as an addition of inductance. The coils are so coupled with the proper number of turns that the current in the anode circuit is held constant, thus protecting the motor at all times from an overload of curent.

Referring to Fig. 3, 1, 2 and 3 denote a three-phase power supply operating the slip ring induction motor P. Slip rings 4, 5, 6 which would normally be connected to a resistance device for speed and torque control are here connected to three sets of tubes which take the place of the above-mentioned resistances. Tubes Q and R, S and T, V and W form three branches of a Y connection, the common connection being formed of the points 7, 8, 9 joined by wires 10 and 11. Tubes Q and R associated together have the plate of one connected to the filament of the other, and vice versa. The object of this is to make the combination the equivalent of a resistance instead of a rectifier. Tubes S and T, V and W are similarly connected. The secondaries of transformers M, N and O supply the control voltage furnished to the grids of the pairs of tubes QR, ST and UV respectively, while the primary windings are each connected to a separate split phase winding made up of a resistance and inductance coil. The resistances are denoted by the numbers 12, 13 and 14. The inductance coils are shown combined into a solenoid 15.

Referring again to the slip ring circuit, it will be noted that the rotor current flows through the primary windings of three transformers W, X and Y. The secondary windings form a three-phase circuit actuating a solenoid 16 which operates a plunger 17, as indicated.

The performance of the circuit is evident. Speed control is obtained by manual operation of lever 19 which controls the phase of the voltage applied to the grids of the tubes. Automatic compensation for heavy changes in load is obtained by the action of the rotor current acting through transformers W, X, Y to operate lever 18. The advantages of employing tubes are, first, that the speed control is made very fine, and, second, that the speed regulation and efficiency of the motor is improved. Unlike the voltage drop in a resistance, the voltage drop in the tubes used is practically independent of the current. Therefore, a motor employing this method of speed control has good speed regulation and efficiency.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. In combination, an alternating current supply line, a variable speed motor adapted to be operated by energy from said line from zero or negative speed to full positive speed, an electron valve device controlling the flow of current through said motor, said valve having a firing control electrode, means for applying a firing control potential to said electrode, and a regulator having an actuating winding in series relation with the flow of motor current to be controlled and having means governed by said winding to shift the phase of firing potential applied by said first named means throughout substantially 180 electrical degrees to limit the current to less than a predetermined value from negative or zero speed of the motor to full positive speed of the motor.

2. In combination with a source of alternating current potential, a variable speed motor having a rotor provided with windings, a circuit for said rotor supplied with energy from said source, means to control the flow of current in said circuit comprising a grid controlled arc rectifying tube, a phase control circuit for said tube including a regulator having a movable part for shifting the phase of grid excitation through substantially 180°, means in series relation to said circuit for moving said movable member according to the current flow in said circuit for limiting the flow of current in said circuit to substantially a predetermined value for all speeds of said motor.

3. Apparatus consisting of an alternating current power supply, a three phase slip ring induction motor operated from said supply, three pairs of grid controlled arc rectifying tubes adapted to form a controlling resistance in the slip ring circuit of the motor, means including an adjustable three phase split phase circuit connected for energization to said slip ring circuit for applying control voltages to the grids of said tubes, means actuated by the slip ring motor current for automatically varying the electrical constants of said split phase circuit, and means for manually modifying said split phase control circuit to change the speed of said motor.

HUGH E. YOUNG.